United States Patent Office 3,794,659
Patented Feb. 26, 1974

3,794,659
ASYMMETRICALLY DISUBSTITUTED ISOINDOLINES
Heinrich Leister, Cologne-Stammheim, and Heinrich Vollmann, Leverkusen, Germany, assignors to Bayer Aktiengesellschaft, Leverkusen, Germany
No Drawing Original application Sept. 8, 1967, Ser. No. 666,458, now Patent No. 3,646,033. Divided and this application Sept. 8, 1971, Ser. No. 178,826
Claims priority, application Germany, Sept. 9, 1966, F 50,163
Int. Cl. C07d 99/02, 99/10
U.S. Cl. 260—305
1 Claim

ABSTRACT OF THE DISCLOSURE

Isoindoline derivatives asymmetrically disubstituted in the 1- and 3-positions corresponding to the formula

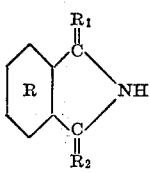

in which the cyclic radical R is an aromatic ring, a substituted aromatic ring, a tetrahydrogenated aromatic ring, a nitrogen containing heterocyclic ring, or a sulphur containing heterocyclic ring, and $R_1$ and $R_2$ which are different, are bivalent radicals of a compound which contains two active hydrogen atoms attached to a nitrogen atom; and a two-stage process for making the same. The isoindoline derivatives are excellent dyestuffs for dyeing and printing synthetic fiber materials.

DISCLOSURE

This application is a division of our co-pending application S.N. 666,458 filed Sept. 8, 1967 now U.S. Pat. 3,646,033.

The invention relates to novel isoindoline derivatives and to a process for producing such.

The novel isoindoline derivatives have the general formula:

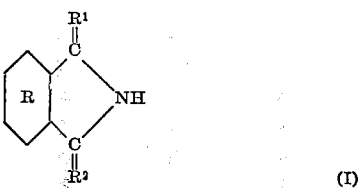

wherein the cyclic radical R is an aromatic ring, a substituted aromatic ring, a tetrahydrogenated aromatic ring, a nitrogen-containing heterocyclic ring, or a sulphur-containing heterocyclic ring and $R^1$ and $R^2$ are different radicals having both valences on a single carbon or nitrogen atom.

It has been found that novel isoindoline derivatives are obtained when an isoindoline which contains easily exchangeable substituents in the 1- and 3-positions is first reacted with one compound which contains two active hydrogen atoms attached to a carbon or nitrogen atom, using not more than 1 mole of the compound containing two active hydrogen atoms per mole of the isoindoline and carrying out the reaction at temperatures from 10° to 110° C., and subsequently reacting the resulting reaction product with at least an equimolar amount of a second, different compound containing two active hydrogen atoms attached to a carbon or nitrogen atom at temperatures from 80° to 220° C.

When 1,3-diimino-isoindoline (II) is used, the process according to the invention can be illustrated by the following reaction scheme:

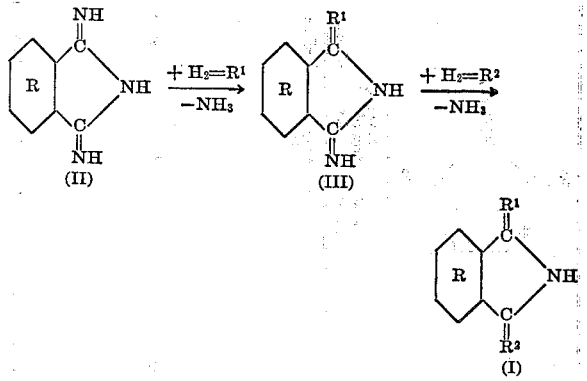

In the above reaction scheme, the 1,3 - diimino-isoindoline is illustrated in one of its tautomeric forms. The cyclic radical R can also contain substituents, such as 1 to 4 chlorine atoms or a phenyl, alkyl, alkoxy or acylamine radical. The radical can further be tetrahydrogenated or it can be a heterocyclic ring containing nitrogen or sulphur. The radicals $R^1$ and $R^2$ are bivalent radicals of a compound which contains two active hydrogen atoms attached to a carbon or nitrogen atom, the radicals $R^1$ and $R^2$ being different.

Preferred $R^1$ radicals include:

(a) Malonic acid esters of preferably lower alcohols; bivalent radicals of cyano-methyl derivatives of the structure

in which A can be a nitrile group; carboxylic acid amide groups which can also contain alykl groups, hydroxyalkyl groups or—optionally substituted—aryl radicals on the nitrogen atom of the amide; carboxylic acid ester groups, the alkoxy radical of which can be derived from short-chain as well as from long-chain, linear or branched alcohols; a —CO-alkyl or —CO-aryl group; a heterocyclic ring system, e.g. an α-pyridyl or benzimidazole radical; an aryl radical which can also contain substituents, such as nitro groups or halogen.

(b) bivalent radicals of the general structure

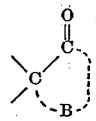

in which B denotes the complement of a five- or six-membered iso- or heterocyclic ring;

(c) Imide radicals which are derived from primary amines of the heteroyclic series.

Preferred $R^2$ radicals include:

(a) Any one of the bivalent radicals mentioned under (a) – (c) for $R^1$ provided that it is different from the radical $R^1$ introduced in the first reaction step;

(b) Imide radicals which are derived from a primary amine of the aliphatic or aromatic series; and (c) Hydrazone radicals of the general structure in

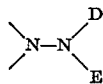

which D and E denote hydrogen or a methyl group, D can be hydrogen and E can be an aryl radical which may be substituted by halogen atoms or nitro groups and D+E can denote the complement of a five- or six-membered hetero ring.

The isoindoline derivatives which contain easily exchangeable substituents in the 1- and 3-positions and serve as starting material for the process according to the invention can be readily obtained by known processes, from such starting materials as o-phthalo-dinitriles, phthalic acid anhydride or phthalimide. Suitable isoindoline starting compounds include:

(a) The 1, 3-diimino-isoindoline (IV) which can also be present or react in tautomeric form as aminoimino-isoindolenine (V)

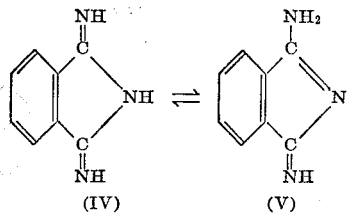

for example, in the form of its salts with weak or stronger acids (cf. German patent specification No. 879,100):

(b) Monomeric alkoxy-isoindolenines and their alcohol addition products of the structure (VI) which are readily obtainable from phthalodinitrile by reaction in anhydrous alcohols and in the presence of an alkali metal alcoholate (cf. German patent specification No. 879,102)

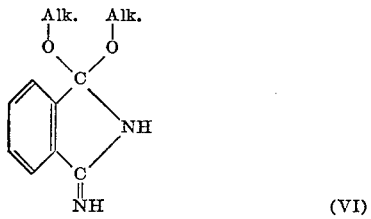

(c) 1,3,3 - trichloro - isoindolenines which can be obtained by the reaction of 2 moles phosphorus pentachloride on phthalimides (cf. German patent specification No. 904,287), e. g. the heptachloroisoindolenine (VII), as well as the amino- or alkoxy-isoindolenines which can be obtained from such, 1,3,3 - trichloro - isoindolenines with ammonia or its substitution products or with alkali metal alcoholates (cf. German patent specification No. 906,935)

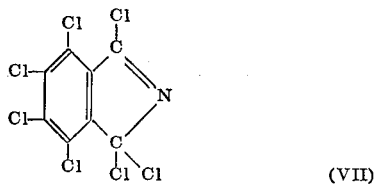

(d) The reaction product of hydrogen bromide with phthalo-dinitrile in solvents such as glacial acetic acid, which, based on analysis and properties, can be assumed to be a dibromine hydrate of 1-bromo-3-imino-isoindolenine (VIII) (cf. FP 1,070,912)

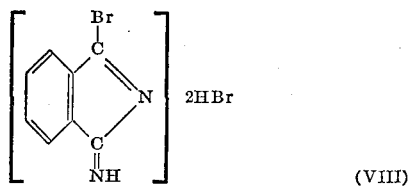

Compounds

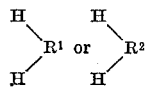

which can be reacted in succession with the isoindoline derivatives serving as starting materials (e.g. those of Formula II) or with the intermediates (e.g. those of the Formula III) include:

(a) Malonic acid dimethyl ester, malonic acid diethyl ester, malonic acid dinitrile, cyano acetic esters of the formula

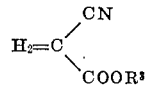

wherein $R^3$ is an ester radical which can be derived from a great variety of alcohols, such as methanol, ethanol, normal-, iso- and tert.-butanol and amyl alcohols; from mixtures of $C_6$–$C_8$ alcohols as can be industrially obtained by known syntheses; from alcohols of the fatty series such as lauryl alcohol or octadecanol; from cycloaliphatic alcohols such as cyclohexanol or menthol; from aliphatic alcohols which contain substituents, such as glycol mono-alkyl ether, ethyelne-chlorohydrin, $\beta$-cyanoethanol, $\beta$-phenoxy- or $\beta$-phenyl-mercaptoethanol, $\beta$-phenylethylalcohol, $\gamma$-phenylpropanol, $\gamma$-phenyl-allyl alcohol; from benzyl alcohol and its substitution products, such as 4-methyl-, 2- and 4-chloro-, 3,4-dichloro- or 2,4,6-trichloro-benzyl alcohols; or from alcohols containing heterocyclic rings, such as tetrahydrofurfur-alcohol; cyano acetamides of the formula

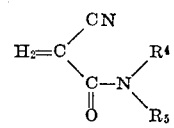

the amide radicals of which can be derived from ammonia and a variety of primary amines ($R^4$=H; $R^5$=alkyl or aryl radical) or secondary amines ($R^4$ and $R^5$=allyl or aryl, or $R^4$ and $R^5$ form 5- or 6-membered rings with the nitrogen), such as methyl-, ethyl-, butyl- and higher paraffin-amines, aniline, p-toluidine, mono- and polychloroanilines, $\gamma$-methoxy- and $\gamma$-dimethylamino-propylamine and mono- or dihydroxyethylamine; $\beta$-cyano ketones of the formula

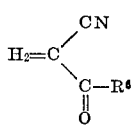

in which $R^6$ can denote a methyl or phenyl radical, such as cyano-acetone and $\omega$-cyanoacetophenone; benzyl cyanide and derivatives thereof substituted in the 2-, 3- and/or 4-positions by fluorine, chlorine or bromine, as well as 3- and 4-nitrobenzyl cyanide; acetonitriles carrying heterocyclic substituents and having the formula

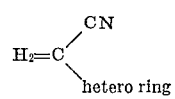

such as pyrazolyl-(3)-acetonitrile,
imidazolyl-(4)-acetonitrile,
2-cyanomethyl-benzimidazole,
1-methyl-2-cyanomethyl-benzimidazole,
1-$\beta$-hydroxyethyl-2-cyanomethyl-benzimidazole,
1-$\beta$-cyanoethyl-2-cyanomethyl-benzimidazole,
2-cyanomethyl-1H-naphth[2,3-d]-imidazole,
1-methyl-1,2,3-triazolyl-(4)-acetonitrile,
2-phenyl-1,2,3-triazolyl-(4)-acetonitrile,
5-phenyl-1,2,3-triazolyl-(4)-acetonitrile,
tetrahydrobenzo-1,2,3-triazolyl-(1)-acetonitrile,
4-phenyl-1,2,4-triazolyl-(3)-acetonitrile,
isoxazolyl-(3)-acetonitrile,
2-cyanomethyl-benzoxazole,
thiazolyl-(4)-acetonitrile, 2-methylthiazolyl-(4)-acetonitrile,
2-cyanomethylbenzothiazole,
pyridyl-(2)-acetonitrile,
pyridyl-(3)-acetonitrile,
pyridyl-(4)-acetonitrile,
quinolyl-(2)-acetonitrile,
quinazolyl-(2)-acetonitrile, or
quinoxalyl-(2)-acetonitrile;

(b) 5- or 6-membered iso- or heterocyclic ketomethylene compounds having the formula

or hydroxy compounds capable of reacting like ketomethylene compounds, such as:
3-methyl-pyrazolone-(5),
1-phenyl-3-methyl-pyrazolone-(5),
1,2-diphenyl-3,5-dioxopyrazolidine,
indoxyl,
N-methyl-indoxyl,
oxindole,
N-methyl- and N-ethyl-oxindole,
barbituric acid,
3-hydroxy-thionaphthene,
2,4-dioxo-1,2,3,4-tetrahydroquinoline,
N-methyl-2,4-dioxo-1,2,3,4-tetrahydroquinoline,
resorcinol,
dihydro-resorcinol,
phloroglucine, or
1,3-diketohydrindene;

(c) Primary amines of the heterocyclic series, such as:
1-phenyl-3-methyl-5-amino-pyrazole,
2-amino-benzimidazole,
1-methyl-2-amino-benzimidazole,
2-amino-benzoxazole,
2-amino-5-nitro-benzoxazole,
2-amino-4-phenyl-thiazole,
2-amino-4-methyl-5-carbethoxy-thiazole,
2-amino-benzothiazole,
2-amino-6-methoxy-, -6-ethoxy- and -6-dimethylamino-benzothiazole,
3-amino-1,2,4-triazole,
3-amino-5-carbethoxy-1,2,4-triazole,
2-amino-1,3,4-oxdiazole,
2-amino-5-cyclohexyl-, -5-benzyl- and 5-γ-pyridyl-1,3,4-oxdiazole,
2-amino-5-phenyl-1,3,4-oxdiazole,
5-amino-3-phenyl-1,2,4-thiadiazole,
2-amino-5-phenyl-1,3,4-thiadiazole,
3-amino-sulpholane,
2-amino-pyridine.

Compounds

which can be reacted with the intermediates (e.g. of the Formula III) include:

(a) Primary amines of the aliphatic or aromatic series, such as methyl- and ethylamine, 2-hydroxy-ethylamine, ethylene-diamine and γ-dimethylamino-propylamine, benzylamine, aniline, o-, m- and p-toluidine, xylidines, mesidine, 2,3- and 4-chloro- or alkoxy-anilines, 3-nitro-aniline, 3- and 4-amino-acetanilide or -benzanilide, N-monophthalyl-p-phenylene-diamine, 3- and 4-amino-benzoic acid, 3- and 4-cyanonaniline, 3-amino-benzamide or -benzanilide, 3-amino-benzene-sulphonamide, 2-phenyl-5-amino-benzotriazole-(1,2,3);

(b) Hydrazines with a free NH₂ group, such as hydrazine, 1,1-dimethyl-hydrazine, phenylhydrazine, halo- and nitro-phenyl-hydrazine, N-amino-piperidine, N-amino-morpholine, N-amino-2-methyl-2,3-dihydro-indole, N-amino-1,2,3,4-tetrahydro-quinoline.

For the production, according to the invention, of the isoindoline derivatives of the General Formula I which are asymmetrically disubstituted in the 1- and 3-positions, it is advantageous to obtain the monosubstituted intermediates, e.g. products of the Formula III, in the purest form possible. In order to achieve this, it is desirable to carry out the reaction of the starting materials with the compounds of the type

at a relatively low temperature, since otherwise symmetrically disubstituted isoindolines may be easily formed. The temperature to be chosen in the first reaction step depends, apart from the solubility of the components and particularly of the resultant intermediate in the solvent used, to a high degree on the activity of the compound

used. With highly reactive cyanomethyl compounds, such as malonic dinitrile or cyanoacetic ester, the starting material can be reacted at room temperature and below to form intermediates of the type of Formula III, whereas with more weakly activated methylene groups and heterocyclic amines the reaction temperature can be raised to 60 to 80° C., without a bilateral reaction occurring. If highly reactive cyanomethyl compounds are used, it may also be expedient to use less than 1 mole of the component

per mole of the isoindoline used as starting material (e.g. only 80% of the theoretical amount), since unreacted isoindoline is, in most cases, substantially more readily soluble than the corresponding monoreaction product (III) which separates and can be easily isolated in pure form by filtering off with suction. The production and properties of a number of monoreaction products of the type (III) are described in the following examples. These products have hitherto been unknown.

As solvents for the reaction of the first reaction step (e.g. [II]→[III]), there are preferably used alcohols in which the starting materials are readily soluble, such as methanol, ethanol, propanols, butanols, glycols and glycol monoethers or diglycol monoethers, further acid amides, such as formamide or dimethyl formamide. In the case of the 1,3-diimino-isoindoline which readily dissolves in water at 20 to 35° C., even water or a mixture of water and alcohol can be useful as a solvent. An addition of ammonia-binding agents may be expedient, especially if the starting materials contain groups which easily react with ammonia, such as carboxylic ester groups.

For the second reaction step (III)→(I), which necessitates higher temperatures of about 80° C. to about 220° C., the same solvents as mentioned above can be used, or, preferably, high-boiling alcohols or other high-boiling solvents, such as aromatic hydrocarbons (e.g. toluene, xylene) and their derivatives (e.g. nitro- or chlorobenzenes), pyridine, quinoline or pyrrolidones. In both reaction steps the amount of solvents used is so chosen—or so adjusted during the reaction by partially distilling off or adding solvent—that the reaction product is present after completion of the reaction in a readily stirrable suspension. In general, there are therefore preferably used about 4 to about 10 parts by volume, referred to parts by weight of the starting material concerned. The process according to the invention enables the hitherto unknown isoindolines of the General Formula I which are symmetrically disubstituted in the 1- and 3-positions, to be produced with good yields and a high degree of purity.

The isoindoline derivatives which can be obtained according to the present process are eminently suitable for the dyeing and printing of synthetic materials made of, for example, polyester, polyamide, cellulose triacetate and also polyacrylonitrile, which they dye in greenish yellow to red shades of good to very good fastness to wet processing, sublimation and thermofixing and good to excellent fastness to light. The affinity can sometimes be improved by mixing individual dyestuffs or also by halogenation. Some of the isoindolonines prepared according to the invention are also interesting as pigment dyestuffs.

In the following examples the parts are parts by weight and the percentages are percent by weight, unless otherwise stated.

EXAMPLE 1

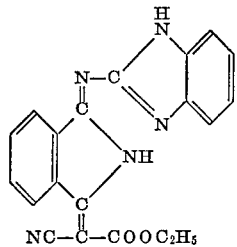

(a) 133 parts 2-amino-benzimidazole (1 mole) and 200 parts of 88% 1-amino-3-imino-isoindolonine (1.2 moles) are stirred in 400 parts by volume formamido at 70° C. for about 10 hours. The reaction product which crystallizes in the form of yellow needles is filtered off with suction after cooling and thoroughly washed with water to remove the amino-imino-isoindolonine used in excess. After drying at 60° C. in a vacuum, the yield of 1 - [benzimidazolyl - (2') - imino] - 3-imino-isoindoline amounts to about 220 parts corresponding to 84% of theory. The mono-substitution product melts at 350–354° C. with decomposition. It dissolves in dilute acetic acid with a yellow color. It forms with phenyl-hydrazine in a glacial acetic acid solution a phenylhydrazone of M.P. 220–225° C. (decomp.), which crystallizes in the form of reddish yellow needles.

(b) 13 parts 1-[benzimidazolyl-(2')-imino]-3-imino-isoindoline obtained according to Example 1(a) and 6 parts cyanoacetic acid ethyl ester are stirred in 100 parts by volume nitrobenzene at 80–90° C. for 3–4 hours, while ammonia escapes. If no more starting material can be detected by chromatography, the mixture is allowed to cool, the reaction product which crystallizes in the form of orange-yellow needles is filtered off with suction, washed with methanol and dried at 90–100° C. There are obtained about 15 parts 1-[benzimidazolyl-(2')-imino]-3-[(cyanocarbethoxy)-methylene]-isoindoline corresponding to 84% of theory of M.P. 278–279° C. (decomp.). The dyestuff dissolves in concentrated sulphuric acid with a yellow color, in a methanolic sodium hydroxide solution with a red-orange color.

EXAMPLE 2

(a) 10 parts of strand material of polyethylene glycol terephthalate are dyed at 96–98° C. for two hours in a bath consisting of 600 parts of water, 0.1 part of the dyestuff of Example 1(b) in finely divided form, 3.4 parts of a mixture of o-, m- and p-cresotic acid methyl ester and 0.6 part of a mixture of equal parts of aralkyl-sulphonate and a non-ionic polyglycol ether, after sulphuric acid had been added until a pH value of 4.5 was obtained. The material is subsequently rinsed and dried. A clear reddish yellow dyeing of good fastness to washing and sublimation and excellent fastness to light is obtained.

(b) 10 parts of loose material of polyethylene glycol terephthalate are dyed at 120–130° C. for 2 hours in a bath at pH 4.5 consisting of 400 parts water and 0.15 part of the dyestuff of Example 1(b) in very finely divided state, as well as of 0.3 part of a mixture of equal parts of an aralkyl-sulphonate and a non-ionic polyglycol ether. After rinsing and drying, a clear reddish-yellow dyeing is obtained.

(c) A fabric of polyester fibre material prepared from terephthalic acid and 1,4-bis-hydroxymethyl-cyclohexane is impregnated on a foulard with a liquor containing, in 1000 parts of water, 20 parts of the dyestuff of Example 1(b) in a very finely divided state, as well as 10 parts of a conventional thermosol auxiliary, particularly a polyethylene ether. The fabric is then squeezed to a weight increase of 70% and dried at 80 to 120° C. It is subsequently treated for about 45 seconds at 180–220° C. with hot air, rinsed, reductively after-treated in known manner, if desired, and dried. A clear reddish yellow dyeing of good fastness to rubbing and sublimation and excellent fastness to light is obtained with a dyestuff yield of almost 100%.

(d) If in Example 2(a) the fabric of polyester material is replaced with a fabric of cellulose triacetate and the process is otherwise carried out as described, then there is obtained a somewhat greenish yellow dyeing of very good fastness to washing and sublimation and excellent fastness to light.

(e) 10 parts of strand material made of a polyamide (prepared by condensation of caprolactam) are slowly heated to boiling temperature in a bath containing, in 400 parts of water, 0.2 part of the finely divided dyestuff prepared according to Example 1(b) and 0.2 part of a conventional dispersing agent, and dyed at the boil for 1 hour. A clear reddish yellow dyeing of very good fastness to water and good fastness to washing and light is obtained.

EXAMPLE 3

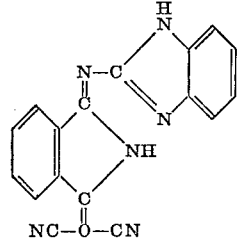

104 parts 1-benzimidazolyl-(2')-imino]-3-imino-isoindoline prepared according to Example 1(a) and 32 parts malonic dinitrile are introduced into 1600 parts by volume nitrobenzene and the mixture is stirred at 80° C. for 2 hours. The 1-[benzimidazolyl-(2')-imino]-3-(bis - cyanomethylene)-isoindoline which crystallizes in the form of orange-colored needles is filtered off with suction after cooling and washing with nitrobenzene and cyclohexane. The yield amounts to about 120 parts corresponding to 97% of theory; M.P. 313–315° C. (decomp.). On polyester fibres a clear intense orange dyeing of good fastness to sublimation and excellent fastness to light is obtained according to Example 2(a) and 2(b), on cellulose triacetate fibres a yellow dyeing fast to light and exhaust fumes is obtained according to Example 2(d), and the dyeings on polyamide fibres according to Example 2(e) are red-orange.

In analogy with Examples 1(b) and 3, the cyanoacetic acid esters stated in the following table can also be reacted with 1-[benzimidazolyl-(2')-imino]-isoindoline, whereby dyestuffs are obtained, which dye polyester, triacetate and polyamide fibres according to Example 2(a) to 2(e) in clear reddish yellow shades of very good fastness properties.

| Example | R³ in NC—CH₂—COOR³ | Yield, percent | M.P. (° C.) |
|---|---|---|---|
| 4 | —C₄H₉(n) | 73 | 188–190 |
| 5 | —⟨H⟩ (cyclohexyl) | 73 | 261–262 |
| 6 | —CH₂—⟨phenyl⟩ | 59 | 228–232 |
| 7 | —(CH₂)₂—⟨phenyl⟩ | 72 | 234–235 |
| 8 | —(CH₂)₃—⟨phenyl⟩ | 75 | 208–210 |
| 9 | —CH₂CH₂OH | 71 | 259–261 |
| 10 | —CH₂CH₂—O—⟨phenyl⟩ | 65 | 271–274 |

EXAMPLE 11

A mixture of 70% of the dyestuff prepared according to Example 7 and 30% of the dyestuff prepared according to Example 5 is thermosolized according to the instructions of Example 2(c). A brilliant golden yellow dyeing of very good fastness to sublimation and rubbing and excellent fastness to light is obtained with a dyestuff yield of about 91%.

Brilliant golden yellow dyeings of very good fastness properties are also obtained with mixtures of the dyestuffs of the following examples:

| Mixture | Dyestuff yield, percent | Fastness to light |
|---|---|---|
| 70% Example 10 plus 30% Example 6 | 87 | Excellent. |
| 70% Example 10 plus 30% Example 8 | 90 | Do. |
| 70% Example 8 plus 30% Example 6 | 87 | Do. |
| 90% Example 6 plus 10% Example 8 | 88 | Do. |

EXAMPLE 12

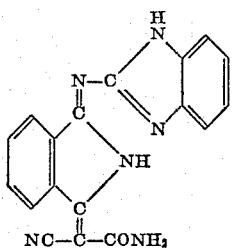

5.2 parts 1-[benzimidazolyl-(2')-imino] - 3 - imino-isoindoline (Example 1a) and 2 parts cyanoacetamide are heated in 30 parts by volume nitrobenzene at 150–160° C. for 10 minutes. Ammonia evolves already during heating up, and 1-[benzimidazolyl-(2')-imino]-3-[(cyano-carbonamido)-methylene]-isoindoline crystallizes after a shot time in the form of yellow-orange short rodlets. The product is filtered off with suction after cooling and washed with methanol. The dyestuff (yield about 70% of theory, M.P. 322–323° C. with decomp.) dyes polyester fibre material according to Example 2(c) in yellow-orange shades.

In a similar manner, 1-[benzimidazolyl-(2')-imino]-3-imino-isoindoline (Example 1a) can also be reacted with the active methylene compounds stated below and the aromatic and heterocyclic amines of the general structure

| Example | H R² / H (structure) | Solvent temperature (° C.) | Yield, percent | Dyeing according to example— | Shade |
|---|---|---|---|---|---|
| 13 | NC—CH₂—CONH—⟨phenyl⟩—CH₃ | Nitrobenzene (100) | 81 | 2(b) 2(c) | Reddish yellow. |
| 14 | NC—CH₂—CO—N(CH₂CH₂OH)₂ | do | 73 | 2(b) 2(c) | Do. |
| 15 | C₆H₅—CO—CH₂—COOC₂H₅ | do | 64 | 2(a) 2(b) 2(c) | Somewhat reddish yellow. |
| 16 | NC—CH₂—C(benzimidazole) | do | 64 | 2(c) | Yellow-orange. |
| 17 | NC—CH₂—C(thiazole) | Without solvent (200-220) | 53 | 2(a) 2(b) | Yellow. |
| 18 | H₂N—⟨phenyl⟩—COOC₂H₅ | p-Aminobenzoic acid ethyl ester (200). | 64 | 2(a) 2(b) | Do. |
| 19 | H₂N—C(pyrazole with CH₃, C₆H₅) | Nitrobenzene (100) | 71 | 2(c) | Reddish yellow. |
| 20 | H₂N—C(triazole) | Nitrobenzene (180) | 60 | 2(c) | Do. |
| 21 | H₂N—C(thiazole with CH₃, COOC₂H₅) | Isobutanol plus a little glacial acetic acid (110). | 87 | 2(a) 2(b) (2c) | Do. |

TABLE—Continued

| Example | H\R³ / H (structure) | Solvent temperature (° C.) | Yield, percent | Dyeing according to example— | Shade |
|---|---|---|---|---|---|
| 22 | H₂N—C with N=benzothiazole | Nitrobenzene (120) | 62 | 2(b) 2(c) | Somewhat reddish yellow. |
| 23 | H₂N—C with N=benzothiazole, OC₂H₅ substituent | ...do... | 61 | 2(c) | Orange-yellow. |
| 24 | H₂N—C(N=N)—C—C₆H₅ with S | ...do... | 73 | 2(a) 2(b) | Yellow. |

EXAMPLE 25

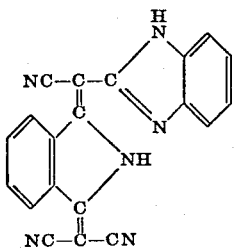

The 1 - [(cyano-benzimidazolyl - 2') - methylene]-3-imino-iso-indoline used as starting material in Example 25(d) can be obtained by the following 3 processes 25(a) to 25(c):

(a) A solution of 16 parts 2-cyanomethyl-benzimidazole (0.1 mole) in 100 parts by volume methanol is rapidly poured into a previously prepared solution of 30.6 parts of 95% 1-amino-3-imino-isoindolenine (0.2 mole) in 400 parts by volume methanol. The mixture acquires a deep yellow color and separation of the monoreaction product in crystalline form begins during the heating up to boiling temperature. The mixture is heated under slight reflux for 1 hour, then cooled to 25–30° C., the product is filtered off with suction, washed with methanol and—in order to completely remove the excess 1-amino - 3 - imino-isoindolenine—washed thoroughly with water. After drying at 60° C. in a vacuum, the 1- [(cyanobenzimidazolyl - 2') - methylene] - 3 - imino-iso-indoline (yield 28 parts corresponding to 98% of theory, referred to 2-cyanomethyl-benzimidazole) is a loose, golden-yellow, finely crystalline powder which is readily soluble in cold glacial acetic acid. It crystallizes from dimethyl formamide upon the addition of methanol, in the form of yellow rhombs which become dark-colored on heating to 280° C. but do not melt up to 330° C. A sample dipped at 345–350° C. turns dark within one minute, sinters and melts with the evolution of gas. When heated with phenyl-hydrazine in a glacial acetic acid solution, the monoreaction product forms a phenyl-hydrazone (orange-red needles) which melts at 256–258° C. with decomposition, after recrystallization from a mixture of toluene and nitro-benzene. With hydrazine hydrate in methanol at 60° C., there is formed a hydrazone which dissolves in glacial acetic acid and concentrated sulphuric acid with a yellow color and in a methanolic sodium hydroxide solution with a deep yellow-orange color and does not melt up to 360° C.

The solutions of 4 parts 1,1-dimethoxy - 3 - imino-isoindoline in 30 parts by volume methanol and of 3.2 parts 2-cyanomethyl-benzimidazole in 20 parts by volume methanol are combined whereupon a deep reddish yellow mixture is formed. The separation of yellow rhombs begins after about 10 minutes. To complete the reaction, the mixture is stirred at 60° C. for one hour, then cooled to room temperature, the product is filtered off with suction, washed with methanol and dried at 60° C. in a vacuum. The crude yield amounts to 5.8 parts corresponding to 100% of theory. For purification the product is dissolved in dimethyl formamide at 85° C., filtered off from a red byproduct (0.25 part 1,3 - bis - [(cyano-benzimidazolyl - 2') - methylene] - isoindoline) and precipitated with methanol. It is filtered off with suction after cooling, washed with methanol and thoroughly dried at 95° C. The reaction product (about 4 to 4.5 parts) is identical with the product obtained according to 25(a) in respect of appearance (yellow rhombs), properties, melting point and analysis.

(c) 24.5 parts 1-piperidino-3-imino-isoindolenine are dissolved in 50 parts by volume methanol and the solution is combined at room temperature with a solution of 15.7 parts 2-cyanomethyl-benzimidazole in 50 parts by volume methanol. In a weakly exothermic reaction the crystallization of yellow rhombs begins after about one minute, and piperidine is eliminated. The mixture is stirred at room temperature for about 3 hours, then suction-filtered, the filter cake is washed with methanol and dried at 80° C. The reaction product (yield about 27 to 28 parts) can be recrystallized from dimethyl formamide+methanol. It yields with phenyl-hydrazine in a glacial acetic acid solution the phenyl-hydrazone of M.P. 256–258° C. (decomp.) which is also obtained according to 25(a).

(d) 50 parts 1 - [(cyano - benzimidazolyl - 2')-methylene] - 3 - imino-isoindoline and 15 parts malonic dinitrile are introduced into 1000 parts by volume nitrobenzene and the mixture is heated with stirring at 160° C. for one hour and then at 210° C. for a short time, whereupon a deep orange-colored solution is formed with the evolution of NH₃. The resultant 1-[(cyano-benzimidazolyl - 2') - methylene] - 3 - (bis - cyano - methylene)-isoindoline crystallizes upon cooling in the form of orange-colored needles. It is filtered off with suction, washed with nitrobenzene and methanol, and after drying there are obtained about 52 parts of the dyestuff, corresponding to 89% of theory (M.P.>360° C.). The dyestuff dissolves in a methanolic sodium hydroxide solution with a red-orange color. Polyester fibres are dyed according to Example 2(a) to 2(c) in brilliant yellowish orange shades of very good fastness to washing and sublimation and excellent fastness to light, triacetate fibres according to Example 2(d) in clear reddish yellow shades and polyamide fibres according to Example 2(e) in reddish orange shades.

By a process similar to that described in Example 25(d), 1 - [(cyano - benzimidazolyl - 2') - methylene]-3-imino-isoindoline can be reacted with other active methylene compounds, with hydrazines and with aromatic and heterocyclic amines of the general formula

(used in equimolar amounts), as can be seen from the following table.

| Example | H–R²–H | Solvent temperature (° C.) | Yield, percent | Dyeing according to Ex.— | Shade |
|---|---|---|---|---|---|
| 26 | NC—CH₂—COO—C₂H₅ | Nitrobenzene (140) | 92 | 2(c) | Yellow-orange. |
| 27 | NC—CH₂—COO—CH₂—C₆H₅ | ....do.... | 93.5 | 2(c) | Do. |
| 28 | NC—CH₂—COO—(CH₂)₂—C₆H₅ | ....do.... | 83 | 2(c) | Do. |
| 29 | NC—CH₂—C₆H₅ | Benzyl cyanide (200) | 56 | 2(c) | Orange-yellow. |
| 30 | H₃C—C(=O)—N(C₆H₅)—N=C—CH₃ (pyrazolone) | Nitrobenzene (120) | 92 | 2(c) | Red. |
| 31 | H₂N—C₆H₅ | Aniline (185) | 73 | 2(b), 2(c) | Reddish yellow. |
| 32 | H₂N—C₆H₄—COOC₂H₅ | p-Amino-benzoic acid ester (200) | 66 | 2(b), 2(c) | Do. |
| 33 | H₂N—C₆H₄—OCH₃ | Nitrobenzene (180) | 84 | 2(a), 2(b) | Golden yellow. |
| 34 | H₂N—C₆H₄—NHCOCH₃ | ....do.... | 84 | 2(c) | Do. |
| 35 | H₂N—(benzimidazolyl, N—C₆H₅) | ....do.... | 76 | 2(c) | Yellow-orange. |
| 36 | H₂N—NH—(tolyl, H₃C) | Ethylene glycol (190) | 55 | 2(a), 2(b) | Do. |
| 37 | H₂N—C(=N—N(C₆H₅))—CH= C—CH₃ (pyrazole amine) | Ethylene-glycol (180–200) | 62 | 2(c) | Reddish yellow. |
| 38 | H₂N—C(=N—CH=CH—NH) (imidazole amine) | Nitrobenzene (180) | 96 | 2(c) | Yellow. |
| 39 | H₃C₂OOC—C₆H₄—NH—C(=S)— | ....do.... | 60 | 2(c) | Red-orange. |
| 40 | H₂N—C(=N—)—S—(benzothiazolyl, OC₂H₅) | ....do.... | 89 | 2(c) | Orange. |
| 41 | H₂N—C(=N—C(CH₃)=C(COOC₂H₅)—S—) (thiazole) | ....do.... | 86 | 2(c) | Do. |

EXAMPLE 42

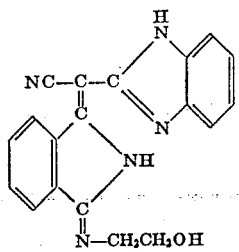

8 parts 1 - [cyano - benzimidazolyl - 2') - methylene]-3-imino-isoindoline (Example 25a) are introduced into 100 parts by volume β-aminoethanol and the mixture is stirred at 80° C. for ½ hour, whereupon the form of the crystals changes. The mixture is diluted with methanol, the product is filtered off with suction after cooling, and washed with methanol and water. According to analysis, the product of the above structural formula has been formed. In contradistinction to the starting material, the product is precipitated from its solution in a methanolic sodium hydroxide solution by means of water. The yield amounts to about 8 parts corresponding to 86.5% of theory.

EXAMPLE 43

10 parts of polyacrylonitrile fibre in the form of strands are introduced at 50° C. into a dyebath of 400 parts of water containing 0.05 parts of the dyestuff obtained according to Example 42, 0.15 parts of 80% acetic acid, 0.2 parts sodium acetate, and 0.4 parts of a condensation product of a higher alcohol with ethylene oxide, for example, the condensation product obtained from 1 mole olefin alcohol and 15 moles ethylene oxide. The temperature of the dyebath is raised to boiling point within 20 minutes and dyeing is continued at this temperature for one hour. The dyebath is then very well exhausted. An intense yellow dyeing of excellent fastness to light is obtained.

EXAMPLE 44

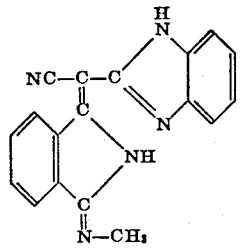

3 parts 1-[(cyano-benzimidazolyl - 2') - methylene]-3-iminoisoindoline (Example 25a) and 80 parts by volume of a 30% methylamine solution are heated with stirring at 60° C. for ½ hour. After cooling, the mixture is diluted with some water, the product is filtered off with suction and washed with water and then with 50% methanol. In contradistinction to the starting material, the reaction product (yield about 2.6 parts corresponding to 83% of theory) can be precipitated from its solution in methanolic sodium hydroxide by means of water. It dyes polyacrylonitrile fibres according to Example 43 in intense yellow shades of excellent fastness to light.

EXAMPLE 45

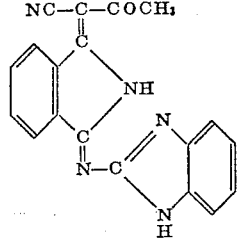

(a) A solution of 11 parts of a mixture of about 80% 5-methyl-isoxazole with about 20% 3-methyl-isoxazole in 50 parts by volume methanol is mixed at a maximum temperature of 50° with 8 parts of a 40% aqueous sodium hydroxide solution, while stirring. As is known, the 5-methyl-isoxazole is thereby split off rather smoothly to form monocyano-acetone, whereas the 3-methyl-isoxazole remains unchanged, so that an alkaline methanol solution is formed which contains about 8.3 parts monocyano-acetone. (The mixture of about 80% 5- and about 20% 3-methyl-isoxazole is most conveniently prepared according to the instructions given by C. H. Eugster, L. Leichner and E. Jenny, Helv. 46, 563–564 (1963) from α-keto-butyraldehyde-dimethyl-acetal with hydroxylamine chlorine hydrate. The said publication also contains references to the smooth splitting of 5-methyl-isoxazole with alkali to form monocyano-acetone according to older literature references.)

The freshly prepared cyano-acetone solution so obtained is immediately stirred at room temperature into a previously prepared solution of 14.5 parts 1,3-bis-imino-isoindoline in 150 parts by volume methanol and the alkalinity is neutralized by the addition of 6 parts glacial acetic acid. The mixture rapidly acquires an increasing yellow coloration; and the separation of pale yellow small crystals begins at about 35° C. (uniform small needles under the microscope). Stirring is continued for 2 hours at a temperature decreasing from 35% to 20° C., the product is filtered off with suction, thoroughly washed with methanol and dried in a vacuum at 50–70° C. Yield 15.2 parts of straw-yellow small needles of 1-(cyano-acetyl-methylene)-3-isoindoline, corresponding to about 82% of theory, referred to the 5-methyl-isoxazole used.

(b) 4.2 parts 1-(cyano-acetyl-methylene) - 3 - imino-isoindoline obtained according to Example 45(a) and 2.7 parts 2-amino-benzimidazole are stirred in 40 parts by volume trichlorobenzene at 130–140° C. for 1½ hours. After cooling, the mixture is diluted with 100 parts by volume methanol, the product is filtered off with suction and washed with methanol. The resultant dyestuff of the above structural formula can be recrystallized from aqueous dioxan or from nitrobenzene to form orange-colored small leaves and then melts at 302–303° C. (decomp.). It dyes polyester fibres according to Examples 2(a) and 2(b) in brown-orange shades.

EXAMPLE 46

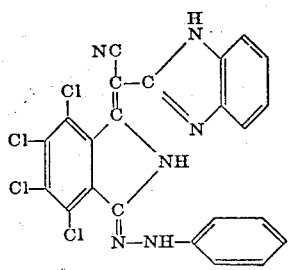

(a) 1-[(cyano-benzimidazolyl-2')-methylene]-3-imino-4,5,6,7-tetrachloro-isoindoline can best be prepared by stirring 11.3 parts 1-amino-3-imino-4,5,6,7 - tetrachloro-isoindolenine and 7 parts 2-cyanomethyl-benzimidazole in 80 parts by volume benzyl cyanide at 80° C. for 1 hour and at 100° C. for 5 hours. After cooling, the product is filtered off with suction, washed with methanol, and there are thus obtained about 14.5 parts of the monosubstitution product, corresponding ot 86% of theroy, in the form of brownish yellow narrow rhombs of M.P. >360° C. The product dissolves in concentrated sulphuric acid with a golden yellow color and gives orange-yellow flakes in water.

(b) 4.25 parts 1-[(cyano-benzimidazolyl-2')-methylene]-3-imino-4,5,6,7-tetrachloro-isoinodoline obtained according to Example 46(a) and 1.5 parts phenyl-hydrazine are heated under reflux in 50 parts by volume of glacial acetic acid for 10 minutes, whereupon the hardly soluble phenyl-hydrazone of the above structural formula results in the form of short red-brown needles. The product dissolves in concentrated sulphur acid with a dirty yellow color, the color of the flakes in water is red-brown. The yield amounts to about 4 parts corresponding to 78% of theory.

EXAMPLE 47

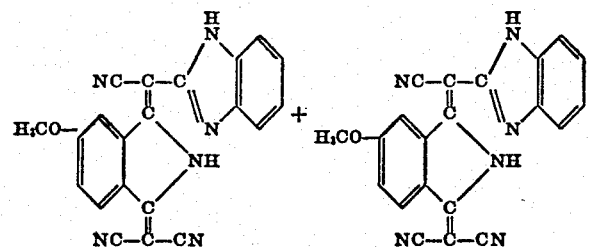

7.5 parts 1,3-diimino-5-methoxy-isoindoline dissolved in 150 parts by volume of 60% aqueous methanol and 6.3 parts 2-cyano-methyl-benzimidazole dissolved in 30 parts by volume methanol are combined and the mixture is stirred at 40° C. for 3 hours. After cooling to <10° C., the product is filtered off with suction and washed with 50% methanol. There is obtained a mixture of 1-[(cyano-benzimidazolyl-2')-methylene]-3-imino-5 - methoxy - isoindoline and 1-[(cyano-benzimidazolyl-2'-)-methylene]-3-imino-6-methoxy-isoindoline. The yield amounts to about 8 parts corresponding to 63% of theory. The product crystallizes from nitrodbenzene or dimethyl formamide in the form of pale yellow small leaves which melt at >360° C. (sintering from about 300° C.). The solutions in pyridine and in concentrated sulphuric acid are yellow.

(b) 2.5 parts of the mixture obtained according to Example 47(a) and 2.5 parts malonic dinitrile are briefly heated in 25 parts by volume of ethylene glycol at 180° C. Orange-colored bent needles crystallize upon cooling. The mixture is diluted with 25 parts by volume methanol, the product is filtered off with suction and there are obtained about 1.5 parts of a mixture according to the above structural formula, corresponding to 52% of theory. The product dyes polyester fibre material according to Example 2(c) in orange shades.

EXAMPLE 48

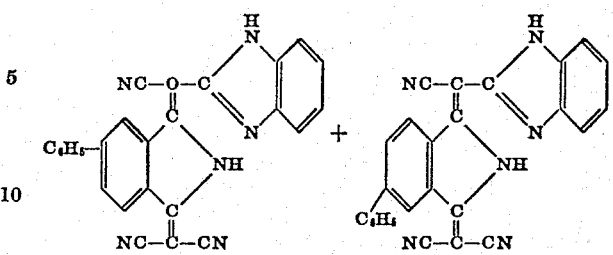

(a) 4.4 parts 1,3-diimino-5-phenyl-isoindoline and 3.1 parts 2-cyanomethyl-benzimidazole are stirred in 30 parts by volume formamide at 60° C. for 1½ hours. After cooling, the yellow suspension is diluted with 50 parts by volume of 50% methanol, the product is filtered off with suction and washed with 50% methanol. There are obtained 5 parts, corresponding to 70% of theory, of a dull yellow, non-crystalline monoreaction mixture of 1-[(cyano-benzimidazolyl-2')-methylene]-3-imino-5-phenyl - isoindoline and 1-[(cyano-benzimidazolyl-2')-methylene]-3-imino-6-phenyl-isoindoline, which yields a phenyl-hydrazone.

(b) 3 parts of the mixture obtained according to Example 48(a) and 2.5 parts malonic dinitrile are heated in 100 parts by volume methanol under reflux for 6 hours while stirring. After cooling, the orange-colored crystallizate is filtered off with suction and washed with methanol. The yield amounts to about 3.1 parts, corresponding to 91% of theory, of a mixture according to the above structural formula. A yellowish orange dyeing of good fastness to sublimation is obtained according to Example 2(a) and 2(b) on polyester fibres.

Further examples for the reaction of 1-amino-3-imino-isoindolenine with compounds of the general structure

to form the monoreaction product (III) and then with compounds of the general structure

to form the dyestuffs (I) are assembled in the following table. In analogy with Examples 1 and 25, a slight excess is used of 1-amino-3-imino-isoindolenine in the first reaction step and of the component

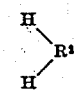

in the second reaction step. Since the components

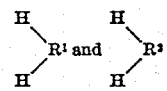

can be reacted on 1-amino-3-imino-isoindolenine in any sequence, identical dyestuffs may result, as is demonstrated, for example, by the Examples 22 and 64, 24 and 69, 41 and 58.

| Example | $H_1 = R^1$ | Solvent temp. (°C.) | Yield, percent | M.P. (°C.) | $H_1 = R^2$ | Solvent temp. (°C.) | Yield, percent | Dyeing according to Ex.— | Shade |
|---|---|---|---|---|---|---|---|---|---|
| 49 | | Formamide (70) | 63 | 218 | NC–CH₂–CN | Methanol (65) | 80 | 2 (a) / 2 (b) | Yellow-orange. |
| 50 | | do | 100 | 333–335 | NC–CH₂–CN | Nitrobenzene (180) | 90 | 2 (c) | Orange-red. |
| 51 | | do | 61 | 257–260 | NC–CH₂–CN | Ethylene glycol (160°) | 67 | 2 (b) / 2 (c) | Yellow-orange. |
| 52 | | Methanol (65) | 65 | 298 | NC–CH₂–CN | Chlorobenzene (130) | 93 | 2 (a) / 2 (b) | Reddish-yellow. |
| 53 | | do | 60 | 267–269 | NC–CH₂–CN | Nitrobenzene (200) | 95.5 | 2 (c) | Reddish orange. |
| 54 | | Methanol (65) | 62 | 267–269 | NC–CH₂–CN | Ethylene glycol (190) | 60 | 2 (c) | Greenish yellow. |
| 55 | | Formamide (70) | 90 | 211–213 | NC–CH₂–CN | Nitrobenzene (80) | 83 | 2 (a) / 2 (b) | Reddish yellow. |

TABLE—Continued

| Example | $H_2=R^1$ | Solvent temp. (°C.) | Yield, percent | M.P. (°C.) | $H_2=R^2$ | Solvent temp. (°C.) | Yield, percent | Dyeing according to Ex.— | Shade |
|---|---|---|---|---|---|---|---|---|---|
| 56 | $H_2N-C\overset{N=C-CH_3}{\underset{S}{\diagdown/}}CH_3$ | Formamide (70) | 85 | 198–200 | NC—CH$_2$—CN | Nitrobenzene (80) | 98 | 2(b) 2(c) | Reddish yellow. |
| 57 | $H_2N-C\overset{N=C-CH_3}{\underset{S}{\diagdown/}}OOCC_2H_5$ | ...do... | 84 | 212–214 | NC—CH$_2$—CN | ...do... | 79 | 2(a) 2(b) 2(c) | Yellow. |
| 58 | $H_2N-C\overset{N=C-CH_3}{\underset{S}{\diagdown/}}COOC_2H_5$ | ...do... | 84 | 212–214 | NC—CH$_2$—C(benzimidazole) | Nitrobenzene (140) | 84 | 2(c) | Orange. |
| 59 | Same as above | ...do... | 84 | 212–214 | HC=C—CH$_3$ / H$_2$N—C / C$_6$H$_5$ | Nitrobenzene (120) | 83 | 2(a) 2(c) 2(d) 2(e) | Yellow. |
| 60 | ...do... | ...do... | 84 | 212–214 | H$_2$N—C(benzoxazole) | ...do... | 75 | 2(a) 2(b) | Do. |
| 61 | ...do... | ...do... | 84 | 212–214 | H$_2$N—C(benzoxazole-OCH$_3$) | ...do... | 61 | 2(a) 2(c) | Yellow orange. |
| 62 | ...do... | ...do... | 84 | 212–214 | $H_2N-C\overset{N-C-C_6H_5}{\underset{S}{\diagdown/}}$ | Nitrobenzene (180) | 100 | 2(a) 2(b) | Yellow. |

TABLE—Continued

| Example | $H_2=R^1$ | Solvent temp. (°C.) | Yield, percent | M.P. (°C.) | $H_2=R^2$ | Solvent temp. (°C.) | Yield, percent | Dyeing according to Ex.— | Shade |
|---|---|---|---|---|---|---|---|---|---|
| 63 | [structure: benzothiazole-2-amine] | Formamide (70) | 83 | 303–305 | NC—CH₂—CN | Nitrobenzene (90) | 63 | 2(b) | Reddish yellow. |
| 64 | Same as above | do | 83 | 303–305 | [structure: benzothiazole-2-amine] | Nitrobenzene (120) | 82.5 | 2(b) 2(c) | Somewhat reddish yellow. |
| 65 | | do | 83 | 303–305 | [structure: 2-aminopyridine] | Ethanol plus some NH₄Cl (80) | | | |
| 66 | | do | 78 | 269–271 | NC—CH₂—CN | Nitrobenzene (180) | 83 | 2(a) 2(b) | Reddish yellow. |
| 67 | [structure: 5-ethoxy-benzothiazole-2-amine] | Ethanol (80) | 97 | 282–283 | NC—CH₂—COOC₂H₅ | Nitrobenzene (140) | 70 | 2(c) | Brown-orange. |
| 68 | [structure: thiadiazole amine] | Formamide (70) | 92 | 246–247 | [structure: benzimidazole] | do | 78 | 2(b) 2(c) | Greenish yellow. |
| 69 | [structure: thiadiazole amine with CH₃] | do | 92 | 246–247 | [structure: benzimidazole] | do | 71 | 2(c) | Orange. |
| | | | | | | | 72 | 2(a) 2(b) | Yellow. |

TABLE—Continued

| Example | $H_2=R^1$ | Solvent temp. (°C.) | Yield, percent | M.P. (°C.) | $H_2=R^3$ | Solvent temp. (°C.) | Yield, percent | Dyeing according to Ex.— | Shade |
|---------|-----------|---------------------|----------------|------------|-----------|---------------------|----------------|--------------------------|-------|
| 70 | [structure with N=N, C-C₆H₅, S, H₂N-C] | Formamide (70) | 92 | 246-247 | [structure with N-CH₃, C-COOC₂H₅, S, H₂N-C] | Nitrobenzene (140) | 82.5 | 2(a) 2(b) | Yellow |
| 71 | Same as above | do | 92 | 246-247 | [benzoxazole structure with H₂N-C] | do | 69 | 2(a) 2(b) | Do. |
| 72 | do | do | 92 | 246-247 | [benzoxazole structure with -OC₂H₅, H₂N-C] | Nitrobenzene (120) | 76 | 2(c) | Yellow-orange. |

EXAMPLE 73

4.7 parts 1-[4'methyl-5'-carbothoxy-thiazoyly-(2')-imino]-3-[1'-phenyl-3'-methyl-pyrazoyly-(5')-imino]-isoindoline prepared according to Example 50 are dissolved in 50 parts by volume pyridine and 0.4 parts bromine are added dropwise at room temperature while stirring. A slight increase of the temperature will be observed and the bromination product is soon precipitated in the form of a thick slurry. After one hour, the suspension is stirred into 500 parts by volume of water, the product is filtered off with suction and thoroughly washed with water. The reaction product contains about 2.7% bromine. The affinity to polyester fibres is noticeably improved when these are dyed according to Example 2(a) and 2(b).

EXAMPLE 74

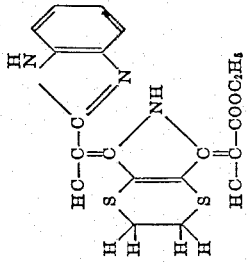

(a) A solution of 18.5 parts 1,3-diimino-4,7-dithiatetrahydro-isoindoline in 300 parts by volume methanol is combined with a solution of 15.7 parts 2-cyanomethyl-benzimidazole in 50 parts by volume methanol, and the mixture is heated under reflux for one hour while stirring. The 1-[(cyano-benzimidazolyl-2')-methylene] - 3-imino-4,7-dithia-tetrahydroisoindoline resulting as monosubstitution product crystallizes in the form of narrow yellow leaflets. Those are filtered off with suction, washed with methanol and dried at 60° C. in a vacuum. The yield amounts to about 22 parts corresponding to 68% of theory. The solution is wine-red in concentrated sulphuric acid, pale orange-yellow in pyridine.

(b) 6.5 parts 1-[cyano-benzimidazolyl-2')-methylene]-3-imino-4,7-dithia-tetrahydro-isoindoline obtained according to Example 74(a) and 6 parts cyanoacetic acid ethyl ester are stirred in 40 parts by volume nitrobenzene at 100° C. for 4 hours. The mixture is then allowed to cool

EXAMPLE 75

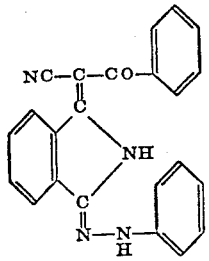

(a) The monosubstitution product used in Paragraph (b) is obtained by stirring a methanolic solution of 1,3-diimino-isoindoline at 20 at most 30° C. with cyano-acetophenone in an amount by 10 to 20% below the theoretical (referred to one mole diimino-isoindoline, i.e. 8/10 to 9/10 mole). The 1-(cyanobenzoyl-methylene)-3-imino-isoindoline which separates in crystalline form after stirring for 2–3 hours, is isolated by filtering off with suction and washing with methanol, and dried in a vacuum at 60° C. The yield amounts to about 80% of theory, referred to cyano-acetophenone. The microscope shows tufty aggregates of pale yellow needles; the product can be recrystallized from the 90-fold amount of toluene (clearly soluble at boiling temperature) and is then precipitated in the form of shiny golden yellow prisms which exhibit the following melting properties: dipped at 220° C., M.P. 223° C. with grassing; melt resolidifies, becomes very dark upon further heating and does not melt again up to 300° C. Dipped at 200° C. and slowly heated, slow decomposition takes place without melting up to 300° C.

(b) 2.8 parts of crude 1-(cyano-benzoyl-methylene)-3-imino-isoindoline obtained according to Paragraph (a) are heated in 50 parts by volume glacial acetic acid at 60° C., and the yellow solution which still contains some undissolved starting material in suspension, is mixed with a solution of 1.1 part phenyl-hydrazine in 15 parts by volume glacial acetic acid. A deep-red (runnings somewhat bluish red) solution is immediately formed and heating is continued at 75–85° C. The 1-(cyano-benzoyl-methylene)-3-phenyl-hydrazene formed separates in the form of a thick red crystal slurry. Stirring is continued at decreasing temperature for ¼ hour, the product is filtered off with suction at 30° C., washed first with glacial acetic acid, then with cyclohexane, and dried in a vacuum at 40° C. Yield 3.2 parts of coarse red needles. According to properties and analysis, the product is a compound of the above structure, which still contains 1 mole acetic acid. When in contact with methanol, the needles change already at room temperature to another shape which contains methanol of crystallization. The phenyl-hydrazene dissolves in a 10% methanolic potassium hydroxide solution with a golden yellow color; the color of the solution changes to an intense red-violet when sufficient 40% sodium hydroxide solution is added. In 90% sulphuric acid the phenyl-hydrazene dissolves with a brown color. This color of the solution changes to olive-green upon the addition of some potassium persulphate or a little pyrolusite.

3-phonylhydrazones of analogous structure, which have a red to orange-red color and very good crystallizing power are obtained according to the instruction given above from all the isoindoline derivatives which are described in the present patent specification and contain a substituted methylene group in the 1-position and an imino group in the 3-position.

EXAMPLE 76

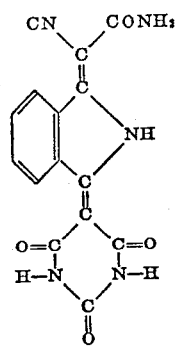

(a) The 1-(cyano-carbonamido-methylene)-3-imino-isoindoline used as starting material in (b) can be prepared as follows: a solution of 17 parts cyanoacetamide in 100 parts by volume methanol at 45° C. is added at 20° C. with stirring to a clear solution of 38 parts 1,3-diimino-isoindoline in 250 parts by volume methanol, and stirring is continued without further heat supply (max. temp. 32° C.). Within a few minutes, the solution acquires an intense yellow color and fine yellow small needles are increasingly precipitated. When the precipitated product is isolated by filtering off with suction, washing with methanol and drying at 90° C., then there are obtained, after five hours' further stirring, 38 parts of first crystallization=90% of theory, referred to cyanoacetamide. When stirring of the mother liquor is continued over night, then there are obtained a further 3 parts by weight of the same good quality as the first crystallization. The total yield is thus 41 parts=96.5% of theory. The 1-(cyanocarbon-amido-methylene)-3-imino-isoindoline crystallizes from the 60-fold amount of formamide (heated to a maximum temperature of 150° C.) in the form of brass-yellow shiny flat prisms or leaflets. When dipped at 285° C., these become dark and exhibit a melting point of about 290° C. with gassing.

(b) 21.1 parts 1-(cyano-carbonamido-methylene)-3-iminoisoindoline (prepared according to Paragraph (a)) are dissolved in 600 parts by volume dimethyl formamide at 90° C. and a solution of 13.5 parts (5% more than the theoretical amount) of barbituric acid in 100 parts by volume dimethyl formamide heated to 50–60° C. is stirred into the above solution. The initially clear yellow solution mixture rapidly becomes cloudy and the resultant condensation product of the above structure is separated in the form of a very finely crystalline yellow crystal slurry. Stirring is continued at 90° C. for 15 minutes; the product is filtered off with suction while warm, briefly washed twice with dimethyl formamide and subsequently with methanol or water, and dried at 90–100° C.

Yield 21–22 parts of a clear yellow soft-grained powder which is insoluble in the usual solvents for lacquers and even in boiling nitrobenzene. When used as a yellow pigment, it yields clear yellow lacquer coatings of good fastness properties.

EXAMPLE 77

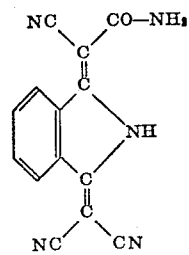

21.2 parts 1-(cyano-carbonamido-methylene)-3-imino-isoindoline (prepared according to Example 76(a)) are stirred in 200 parts dimethyl sulphoxide with 11 parts malonic dinitrile and the mixture is heated. A clear solution begins to form already at 50–60° C. the yellow color of which becomes more and more reddish as the temperature rises up to about 110° C. 50 parts glacial acetic acid are added and stirring is continued at 100° C. for 15 minutes. The mixture is subsequently diluted, while slowly stirring, with a mixture of 200 parts of water, 50 parts glacial acetic acid and 300 parts by volume methanol, a final temperature of about 20° C. being achieved by cooling. During the diluting operation, the golden yellow condensation product crystallizes (in the form of clusters of coarse prisms when examined under the microscope). Yield of 1-(cyano-carbonamido-methylene) - 3 - (biscyano-methylene)-isoindoline: 24.5 parts=94% of theory.

In contradistinction to the product, this compound no longer yields red phenyl-hydrazone when heated with phenylhydrazine in glacial acetic acid. It readily dissolves in cold pyridine and subsequently recrystallizes as an orange-colored pyridine salt. When the suspension of the pyridine salt is dissolved with plenty of hot water, then a yellow solution is formed from which polyamide fibres are dyed in intense and clear yellow shades.

EXAMPLE 78

(a) The 1-(bis-cyano-methylene)-3 - imino-isoindoline described in Paragraph (b) and used as starting material is prepared from a methanolic solution of 1,3-bis-imino-isoindoline with the addition of a molar amount of malonic dinitrile at room temperature. Immediately after the addition of the malonic dinitrile, a finely crystalline pale yellowish precipitation occurs. If necessary, the suspension is sufficiently diluted with methanol to remain homogeneously stirrable. After further stirring for 10 minutes, the reaction is already completed at room temperature. Water is added in an amount of 50% by volume of the suspension, the product is filtered off with suction, thoroughly washed with water and dried in a vacuum at 60° C. Yield about 95% of theory in form of a slightly yellowish finely crystalline powder which is only barely soluble in glacial acetic acid and hydrocarbons, even in the hot. It is partially dissolved in dimethyl formamide at room temperature but recrystallizes within a short time in the form of a thick slurry of pale yellow solvated crystals. It clearly dissolves in warm dimethyl formamide with an intense yellow color. In dimethyl sulphoxide, it gives a clear stable solution already at room temperature. Even if the preparation is carried out with 2 moles malonic nitrile per mole bis-imino-isoindoline, and 1 mole glacial acetic acid is added to the solvent methanol (in order to accelerate the reaction to form 1,3-bis-(dicyano-methylene)-isoindoline) and the mixture is heated at boiling temperature under reflux for 4 hours, the amount of product isolated by suction-filtration still consists of the pure monoreaction product described above (about 43% of theory), since the 1,3-bis-(dicyano-methylene)-isoindoline formed (in a yield of about 45%) remains dissolved with a deep orange-yellow color in the ammoniacal methanol filtrate from which it separates in the form of orange-yellow flakes only upon acidification. The 1,3-bis-(dicyano-methylene)-isoindoline (structure as illustrated)

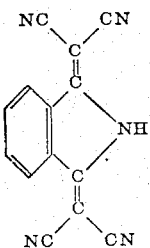

is obtained in the form of golden yellow shiny small needles by dissolving in the six-fold volume of dimethyl formamide at 50° C., diluting with the same volume of methanol and cooling. It dissolves already in a dilute hot sodium carbonate solution with a yellow color and in cold pyridine with a red-orange color and decomposes with gassing—after dipping at 320° C.—only above 350° C. In contradistinction to the monoreaction product described above, it gives no phenyl-hydrazone derivative with phenylhydrazine in boiling glacial acetic acid.

(b) 9.7 parts 1-(bis-cyano-methylene)-3-iminoisoindoline (prepared according to Paragraph (a) are finely dispersed in glacial acetic acid and, after the addition of 8 parts o-nitrophenyl-hydrazine, heated at boiling temperature for 5 minutes. The o-nitrophenyl-hydrazone of the structure as illustrated is precipitated in the form of brownish red-orange fine prims with a good yield. The product hardly dissolves in a 10% methanolic potassium hydroxide solution, forming only a dark potassium salt.

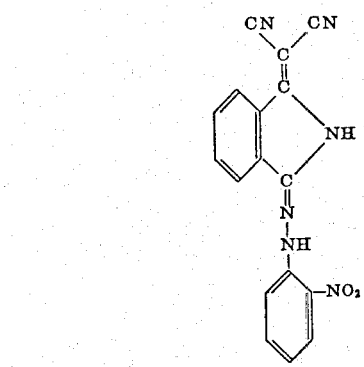

In a 25% methanolic potassium hydroxide solution, a characteristic deep blue-green solution is partially formed, besides crystallized potassium salt. The 2,4-dinitrophenyl-hydrazone derivative of analogous structure (prepared from the same starting material with approximately molar amounts of 2,4-dinitrophenyl-hydrazine in glycol by briefly heating to 180° C.) is very similar to the 2-nitrophenyl-hydrazone derivative described above in respect of its intrinsic color and the crystal form, but it gives a blue-violet solution with a 10% methanolic potassium hydroxide solution, whereas it is hardly soluble in a 25% methanolic potassium hydroxide solution. The corresponding unsubstituted phenyl-hydrazone derivative—yellowish red fine prisms, M.P. and decomp. p. 253–256° C.—readily dissolves in a 10% as well as in a 25% methanolic potassium hydroxide solution. These solutions are both red-orange in a thick layer and greenish yellow in a very thin layer.

EXAMPLE 79

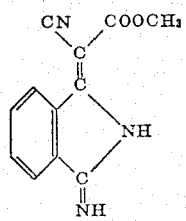

reacted with hydrazine in glacial acetic acid.

(a) A solution of 99 parts cyanoacetic acid methyl ester in 100 parts methanol is slowly poured at 20° C., with stirring and external cooling with water, into a clear possibly filtered, solution of 200 parts of 94.5% 1,3-bis-imino-isoindoline (corresponding to one mole of pure product +30% excess), within a period of time which enables a temperature of 20° C. to be maintained. During the addition of the ester, the solution first turns yellowish, but soon a pale yellow, thick, finely crystalline precipitate occurs. After further stirring for 2 hours, the reaction is already completed at 20° C. The product is filtered off with suction, washed first with 250 parts methanol and subsequently thoroughly with water. After drying in a vacuum, there are obtained 184.5 parts of an only slightly yellowish, finely crystalline powder which, according to analysis and properties, is almost pure 1-(cyano-carbomethoxy-methylene)-3-imino-isoindoline. 184.5 parts correspond to about 62% of theory, referred to the bis-imino-isoindoline used (in excess) or to 92% of the theoretical amount of 227 parts, referred to cyanoacetic ester. The product can be recrystallized from the 70-fold amount of methanol and is then obtained in the form of slightly yellow needles. The melting properties of the recrystallized product do not differ from those of the crude product. Samples of both products, dipped in melting point tubes at 195° C., change via orange to brown-black and decompose with gassing at 202–203° C.

If in the reaction described above, the starting materials are used in a molar ratio of about 1:1 and the process is otherwise carried out in the same manner, then the resultant crude product already contains 5 or more percent of 1,3-bis-(cyano-carbomethoxy-methylene)-isoindoline. The amount of this byproduct, moreover, increases as the reaction temperature rises and upon the addition of glacial acetic acid. The bis-reaction product becomes the predominant main product when 2 moles cyanoacetic acid ester are used per mole 1,3-diimino-isoindoline. It crystallizes from glacial acetic acid or chlorobenzene in the form of yellow shiny prisms of decomposition point 285–287° C. and can be most rapidly distinguished from the monoreaction product described above by the fact that it yields no red-orange reaction product when heated in glacial acetic acid with some phenyl-hydrazine.

(b) 11.4 parts 1-(cyano-carbomethoxy-methylene)-3-imino-isoindoline (prepared according to Paragraph (a)) are heated in 250 parts by volume glacial acetic acid until the material dissolved at about 65° C. 5 parts of a 25% hydrazine hydrate solution are then slowly added with stirring, whereupon the color first changes to orange, and, finally, orange-colored small crystals are increasingly precipitated. Heating is continued at boiling temperature for 2–5 minutes, the mixture is allowed to cool to 20° C., the product is filtered off with suction, washed with glacial acetic acid, then with methanol and finally with water, and dried at 90–100° C. The yield of light orange-colored small needles is 9.55 parts=83.5% of the starting material. The product crystallizes from dimethyl formamide in the form of long red-orange needles and has a decomposition point of 315° C. It is insoluble in hot methanol; when a small amount of a 40% sodium hydroxide solution is added, it gives a carmino-red solution from which a violet Na-salt crystallizes upon cooling.

(c) The 1-(cyano-carboethoxy-methylene)-3-imino-isoindoline prepared in analogy with Paragraph (a) but with cyanoacetic acid ethyl ester, can be obtained in a similarly good yield, if—because of the greater solubility of the ethyl ester—the crystal slurry is concentrated after the reaction to about half its volume. The crude product has a decomposition point of 155–160° C. It can be recrystallized from the 25-fold amount of benzene, whereupon coarse shiny prisms crystallize out, which lose their gloss when dried. The decomposition point of the pure product is 161–162° C. after change of color to orange to dark brown.

EXAMPLE 80

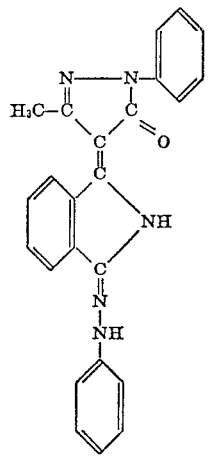

(a) The 1-[1'-phenyl-3'-methyl-5'-oxo)-pyrazolidene-4']-3-imino-isoindoline used in Paragraph (b) is prepared by adding a solution of 17.4 parts 1-phenyl-3-methyl-pyrazolone-(5) in 120 parts by volume methanol heated to 30° C. to a solution of 21 parts 1,3-diimino-isoindoline (45% excess) in 200 parts by volume methanol at a maximum temperature of 30° C., while stirring. The mixture acquires a deep brownish red color (dull yellowish to orange in a thin layer) and crystals of vitrous lustre begin to separate after a few minutes (flat rhombs or prisms by weak magnification under the microscope, red-orange by transmitted light). Working up is carried out by filtering off with suction at 15–18° C., washing with a little cold methanol and drying in a vacuum at 50° C. Yield of glassy crystals which are red-orange by transmitted light and contain 1 mole methanol of crystallization: 29.0 parts=87% of the theoretical amount of 33.4 parts.

(b) 33.4 parts 1-[(1'-phenyl-3'-methyl-5'-oxo)-pyrazolidene-4']-3-imino-isoindoline containing 1 mole methanol of crystallization (prepared according to Paragraph (a)) are heated in 600 parts by volume glacial acetic acid at 110° C. whereupon the product dissolves with a yellow-brown colour. When 13 parts phenyl-hydrazine are then added, the solution becomes dark-red, and brownish red small prisms crystallise within one minute to form a thick slurry. Heating is continued at boiling temperature for about 10 minutes, the product is filtered off with suction when cold, washed once with glacial acetic acid, then thoroughly with water, and dried at 100° C. Yield is 30 parts=77% of the theoretical amount of 39.3 parts. Melting point (dipped at 185° C.) is 191° C., with decomposition. The product clearly dissolves in the 15-fold amount of hot toluene. When this solution is diluted with twice its volume of methanol, then the phenyl-hydrazone derivative is precipitated with one mole methanol in the form of long flat brownish-red crystals having a slight brassy lustre. The decomposition point (dipped at 185° C.), is 194–195° C. The solution in concentrated sulphuric acid is initially red-violet, rapidly changing to carmine red. The likewise red-violet solution in 85% sulphuric acid turns dull blue and finally green upon the addition of pyrolusite.

EXAMPLE 81

(a) 1-(2',4'-dinitro-phenyl-hydrazono)-3-imino-isoindoline can be obtained in the usual manner from 10 parts 2,4-dinitro-phenyl-hydrazine and 12 parts of 96.5% 1-amino-3-imino-isoindolenine in 50 parts by volume formamide at 60° C. Yield is 15 parts=91% of theory.

(b) 3.3 parts 1-(2',4'-dinitro-phenyl-hydrazono)-3-imino-isoindoline obtained according to Example 81(a) and 1.3 parts malonic dinitrile are heated in 50 parts by volume nitrobenzene at 200–210° C. for 10 minutes. The reaction product of the structure as illustrated which crystallizes in the form of orange-colored needles is filtered off with suction while still warm and washed with nitrobenzene and methanol. It dissolves in concentrated sulphuric acid with a yellow colour, in a methanolic sodium hydroxide solution upon the addition of pyridine with a bluish red color.

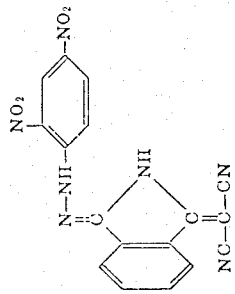

The yield amounts to about 2.8 parts corresponding to 75% of theory. Polyester fibre material is dyed according to Example 2(c) in yellow-orange shades.

EXAMPLE 82

A solution of 6.8 parts 1-[(cyano-carbomethoxy)-methylene]-3-imino-isoindoline (Example 79a) in 50 parts by volume ethylene glycol heated to 80° C. is combined with a solution of 6 parts 2,4-dinitrophenyl-hydrazine in 70 parts by volume ethylene glycol heated to 180° C., 1.8 parts by volume glacial acetic acid are added and the mixture is heated at 180–190° C. for 5–10 minutes. The dinitrophenyl-hydrazone of the structure as illustrated has then formed.

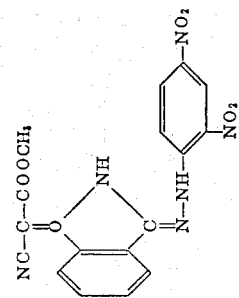

The mixture is diluted at about 80° C. with 60 parts by volume methanol, the product is filtered off with suction and washed with methanol. The dyestuff (yield about 8 parts corresponding to 65% of theory) forms orange-colored needles of M.P. 253–255° C. (decomp.) after recrystallization from nitrobenzene. It dyes polyester fibres according to Examples 2(a) to 2(c) in intense yellow-orange shades of very good fastness to sublimation and good fastness to light.

Further Examples for the reaction of monoreaction products (III) with compounds of the general structure

to form the dyestuffs (I) can be seen from the following table.

| Example | (III) | Preparation according to Ex.— | R¹ in <br>NC—C—C— | R² | R³ | Solvent temp. (° C.) | Yield, percent | Dyeing according to Ex.— | Shade |
|---|---|---|---|---|---|---|---|---|---|
| 83 | | 25(a) | NC—C—COOCH₃ | COOC₂H₅ <br>H₃C COOC₂H₅ | | Dimethyl formamide (150) | 65 | 2(a), 2(b), 2(c) | Reddish yellow. |
| 84 | Same as above | 25(a) | do | NC—CH₂—COOCH₃ | | Nitrobenzene (140) | 89 | 2(c) | Orange-yellow. |
| 85 | do | 25(a) | do | NC—CH₂—COOC₄H₉(n) | | Nitrobenzene (180) | 77.5 | 2(c) | Yellow-orange. |
| 86 | do | 25(a) | do | NC—CH₂—COO—CH₂—CH | CH₃ <br>CH₃ | Isobutanol (110) | 100 | 2(c) | Do. |
| 87 | do | 25(a) | do | NC—CH₂—COO— | H | Nitrobenzene (180) | 85.5 | 2(c) | Do. |

TABLE—Continued

| Example | R¹ in structure | Preparation according to Ex.— | (III) R² / R³ | Solvent temp. (°C) | Yield, percent | Dyeing according to Ex.— | Shade |
|---|---|---|---|---|---|---|---|
| 88 | Same as Example 83 | 25(a) | H₂N–N=N–C–COOC₂H₅ (with NH) | Dimethyl formamide (160) | 63 | 2(c) | Reddish yellow. |
| 89 | (benzimidazole structure HC–C=) | 25(a) | H₂N–CH–CH₂–CH–CH₂ with H₃C–CH–SO₂ | Nitrobenzene (180) | 60 | 2(c) | Yellow. |
| 90 | (benzoxazole structure) | 1(a) | NC–CH₂–COO–(CH₂)₂–O–(CH₂)₂–OC₂H₅ | Nitrobenzene (90) | 61.5 | 2(a), 2(b), 2(c) | Reddish yellow |
| 91 | Same as above | 1(a) | H₅C₂OOC–CH₂–COOC₂H₅ | Dimethyl formamide (100) | 75 | 2(a), 2(b), 2(c) | Yellow. |
| 92 | do | 1(a) | (benzoxazole with CH–CH₃ and C₆H₅) | Nitrobenzene (140–180) | 69 | 2(a), 2(b), 2(c) | Reddish yellow. |
| 93 | do | 63 | (benzoxazole H₂N–C) | Nitrobenzene (140) | 60 | 2(a), 2(b), 2(c) | Greenish yellow. |
| 94 | do | 63 | do | do | 90.5 | 2(a), 2(b), 2(c) | Yellow. |
| 95 | do | 63 | (cyclohexyl N=C–O with H₂N) | Nitrobenzene (180) | 63 | 2(a), 2(b), 2(c) | Yellow. |

TABLE—Continued
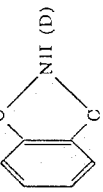
| Example | (III) | Preparation according to Ex.— | Solvent temp. (°C.) | Yield, percent | Dyeing according to Ex.— | Shade |
|---|---|---|---|---|---|---|
| 96 | Same as Example 90 | 63 | Nitrobenzene (180) | 60 | 2(a), 2(b), 2(c) | Yellow. |
| 97 | Same as above | 63 | do | 82 | 2(c) | Do. |
| 98 | | 57 | do | 89 | 2(c) | Reddish yellow. |
| 99 | | 68 | do | 64 | 2(b), 2(c) | Greenish yellow. |
| 100 | | 68 | Nitrobenzene (140) | 81 | 2(b), 2(c) | Do. |
| 101 | | 68 | do | 60 | 2(a), 2(b) | Yellow. |

We claim:
1. The compounds of the formula
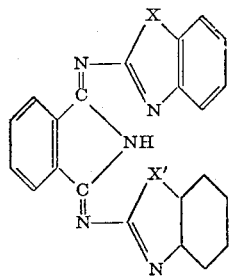
wherein X and X' are O, S, or NH, however, both not identical.
References Cited
UNITED STATES PATENTS
3,499,908  3/1970  Vollman et al. _____ 260—305
3,646,033  2/1972  Leister et al. _____ 260—305
RICHARD J. GALLAGHER, Primary Examiner
U.S. Cl. X.R.
260—307 D